United States Patent
Miyamoto et al.

(10) Patent No.: US 11,563,717 B2
(45) Date of Patent: Jan. 24, 2023

(54) GENERATION METHOD, GENERATION DEVICE, AND RECORDING MEDIUM

(71) Applicant: Nippon Telegraph and Telephone Corporation, Tokyo (JP)

(72) Inventors: Kunio Miyamoto, Musashino (JP); Shingo Orihara, Musashino (JP); Yuta Iwaki, Musashino (JP); Yo Kanemoto, Musashino (JP); Yuichi Murata, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 15/734,233

(22) PCT Filed: Apr. 15, 2019

(86) PCT No.: PCT/JP2019/016221
§ 371 (c)(1),
(2) Date: Dec. 2, 2020

(87) PCT Pub. No.: WO2019/235074
PCT Pub. Date: Dec. 12, 2019

(65) Prior Publication Data
US 2021/0168121 A1 Jun. 3, 2021

(30) Foreign Application Priority Data

Jun. 4, 2018 (JP) .............................. JP2018-107255

(51) Int. Cl.
*H04L 9/40* (2022.01)

(52) U.S. Cl.
CPC ...... *H04L 63/0254* (2013.01); *H04L 63/0236* (2013.01); *H04L 63/0263* (2013.01)

(58) Field of Classification Search
CPC ... G06N 20/00; H04L 63/1416; H04L 63/441; H04L 63/1483; H04L 61/3025; H04L 43/04; H04L 51/12; H04L 67/02; H04L 47/2441

See application file for complete search history.

(56) References Cited

U.S. PATENT DOCUMENTS

2017/0126724 A1    5/2017   Zhong et al.

FOREIGN PATENT DOCUMENTS

WO    2015/186662 A1    12/2015

*Primary Examiner* — Brian F Shaw
(74) *Attorney, Agent, or Firm* — Xsensus LLP

(57) ABSTRACT

A generation method includes identifying, as paths that are abstraction candidates, dynamically generated paths among paths in a profile that is used to determine whether each request to a server is an attack, and counting numbers of path variations corresponding to the respective paths that are abstraction candidates, and abstracting paths contained in the profile when a number of variations counted at the counting satisfies a certain condition, by processing circuitry.

6 Claims, 16 Drawing Sheets

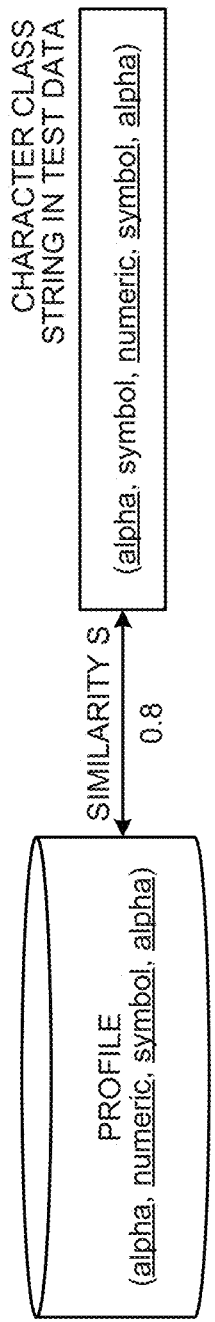

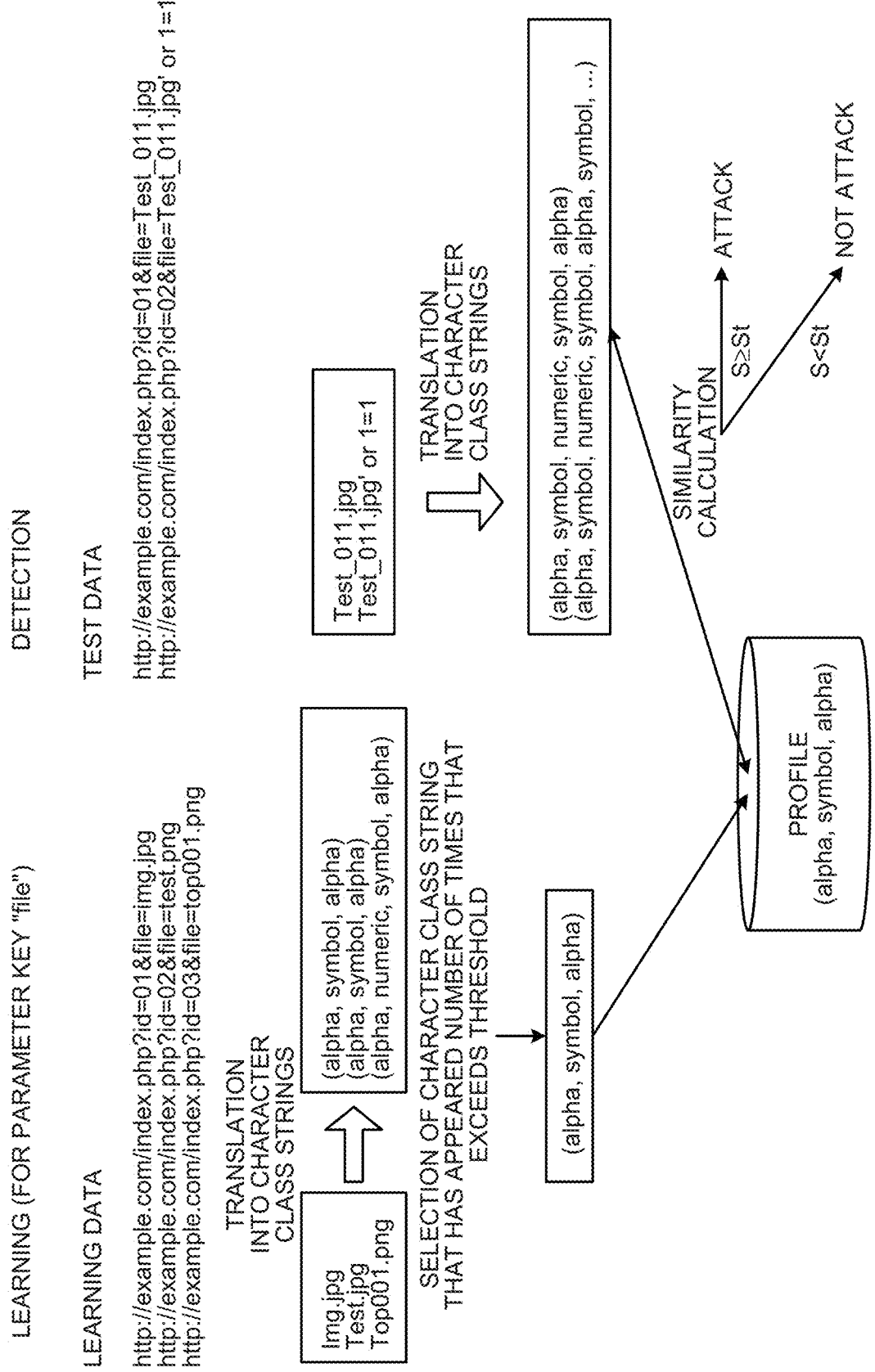

FIG.5

EXAMPLE OF PROFILE

| PATH | PARAMETER KEY | CHARACTER CLASS STRING | NUMBER OF OCCUR-RENCES |
|---|---|---|---|
| /index.php | id | {AL, NU} | 200 |
| /index.php | id | {AL} | 100 |
| /index.php | cc | {AL} | 100 |
| /dynamic001.php | file | {AL, NU, SY, AL} | 1 |
| /dynamic002.php | file | {AL, NU, SY, AL} | 1 |
| : | : | : | : |

FIG.6

LEARNING DATA HTTP REQUESTS http://example.com /a1b2c3d4e5/program.php?id=user001
http://example.com /f1b6c8d2e1/program.php?id=user002&cc=jp
http://example.com /1a8e7f5db6/program.php?file=img001.jpg
http://example.com /application/view.php?read=text01.txt

PROFILE (BEFORE PATH ABSTRACTION PROCESSING)

| PATH | PARAMETER KEY | CHARACTER CLASS STRING | NUMBER OF OCCUR-RENCES |
|---|---|---|---|
| /a1b2c3d4e5/program.php | id | {AL, NU} | 1 |
| /f1b6c8d2e1/program.php | id | {AL, NU} | 1 |
| /f1b6c8d2e1/program.php | cc | {AL} | 1 |
| /1a8e7f5db6/program.php | file | {AL, NU, SY, AL} | 1 |
| /application/view.php | read | {AL, NU, SY, AL} | 1 |

FIG.7

LEARNING DATA HTTP REQUESTS http://example.com /a1b2c3d4e5/program.php?id=user001
http://example.com /f1b6c8d2e1/program.php?id=user002&cc=jp
http://example.com /1a8e7f5db6/program.php?file=img001.jpg
http://example.com /application/view.php?read=text01.txt

PROFILE (AFTER PATH ABSTRACTION PROCESSING)

| PATH | PARAMETER KEY | CHARACTER CLASS STRING | NUMBER OF OCCUR-RENCES |
|---|---|---|---|
| /<DYNAMIC>/program.php | id | {AL, NU} | 2 |
| | cc | {AL} | 1 |
| | file | {AL, NU, SY, AL} | 1 |
| /application/view.php | read | {AL, NU, SY, AL} | 1 |

FIG.8

PROFILE (BEFORE PATH ABSTRACTION PROCESSING)

| PATH | PARAMETER KEY | CHARACTER CLASS STRING | NUMBER OF OCCUR-RENCES |
|---|---|---|---|
| /a1b2c3d4e5/program.php | id | {AL, NU} | 1 |
| /f1b6c8d2e1/program.php | id | {AL, NU} | 1 |
| /f1b6c8d2e1/program.php | cc | {AL} | 1 |
| /1a8e7f5db6/program.php | file | {AL, NU, SY, AL} | 1 |
| /application/view.php | read | {AL, NU, SY, AL} | 1 |

PATH ABSTRACTION CANDIDATE COUNTING LIST

| ABSTRACTION CANDIDATE PATH | ABSTRACTION TARGET PATH | NUMBER OF PATH VARIA-TIONS |
|---|---|---|
| /<DYNAMIC>/program.php | /a1b2c3d4e5/program.php<br>/f1b6c8d2e1/program.php<br>/1a8e7f5db6/program.php | 3 |

FIG.10

PATH ABSTRACTION CANDIDATE COUNTING LIST

| ABSTRACTION CANDIDATE PATH | ABSTRACTION TARGET PATH | NUMBER OF PATH VARIA- TIONS | |
|---|---|---|---|
| /<DYNAMIC>/program.php | /a1b2c3d4e5/program.php<br>/f1b6c8d2e1/program.php<br>/1a8e7f5db6/program.php | 3 | ← PATH ABSTRACTION IS DETERMINED TO BE "NECESSARY" BECAUSE NUMBER OF PATH VARIATIONS ≥ THRESHOLD FOR NUMBER OF PATH VARIATIONS |
| /<DYNAMIC>/view.php | /<DYNAMIC>/view.php | 1 | ← PATH ABSTRACTION IS DETERMINED TO BE "UNNECESSARY" BECAUSE NUMBER OF PATH VARIATIONS < THRESHOLD FOR NUMBER OF PATH VARIATIONS |

FIG.12

PROFILE (BEFORE PATH ABSTRACTION PROCESSING)

| PATH | PARAMETER KEY | CHARACTER CLASS STRING | NUMBER OF OCCUR-RENCES |
|---|---|---|---|
| /a1b2c3d4e5/program.php | id | {AL, NU} | 1 |
| /f1b6c8d2e1/program.php | id | {AL, NU} | 1 |
| /f1b6c8d2e1/program.php | cc | {AL} | 1 |
| /1a8e7f5db6/program.php | file | {AL, NU, SY, AL} | 1 |
| /application/view.php | read | {AL, NU, SY, AL} | 1 |

▽

PATH ABSTRACTION CANDIDATE COUNTING LIST

| ABSTRACTION CANDIDATE PATH | ABSTRACTION TARGET PATH | NUMBER OF PATH VARIA-TIONS |
|---|---|---|
| /<HEX>/program.php | /a1b2c3d4e5/program.php<br>/f1b6c8d2e1/program.php<br>/1a8e7f5db6/program.php | 3 |

GENERATION OF PATH ABSTRACTION PATTERN "/<hexadecimal number of at least 3 digits>/program.php"

PATHS FOR WHICH PATH ABSTRACTION IS "NECESSARY"

FIG.15

PROFILE (BEFORE PATH ABSTRACTION PROCESSING)

| PATH | PARAMETER KEY | CHARACTER CLASS STRING | NUMBER OF OCCUR-RENCES |
|---|---|---|---|
| /main/program.php | id001 | {AL, NU} | 1 |
| /main/program.php | id005 | {AL, NU} | 1 |
| /main/program.php | id512 | {AL, NU} | 1 |
| /main/program.php | id789 | {AL} | 1 |
| /application/view.php | read | {AL, NU, SY, AL} | 1 |

PARAMETER KEY ABSTRACTION CANDIDATE COUNTING LIST

| PATH FOR ABSTRACTION CANDIDATE PARAMETER KEY | ABSTRACTION CANDIDATE PARAMETER KEY | ABSTRACTION TARGET PARAMETER KEY | NUMBER OF PARAMETER KEY VARIATIONS |
|---|---|---|---|
| /main/program.php | id<NUM> | id001<br>id005<br>id512<br>id789 | 4 |

GENERATION METHOD, GENERATION DEVICE, AND RECORDING MEDIUM

CROSS-REFERENCE TO RELATED APPLICATIONS

The present application is based on PCT filing PCT/JP2019/016221, filed Apr. 15, 2019, which claims priority to JP 2018-107255, filed Jun. 4, 2018, the entire contents of each are incorporated herein by reference.

TECHNICAL FIELD

The present invention relates to a generation method, a generation apparatus, and a recording medium.

BACKGROUND ART

Attacks to Web servers are sharply increasing as the Internet grows. Techniques such as an intrusion detection system (IDS), an intrusion prevention system (IPS), and a web application firewall (WAF) are known as countermeasures against such attacks. These techniques are configured to perform detection of and protection against previously known attacks through detection based on patterns that have been created using blacklists and signature files.

Other techniques configured to detect previously unknown attacks are known. Such a technique is configured to: learn, as a profile, information such as features of parameter values from normal access requests to a web server; and compare, with the profile, a feature of an access request that needs to be identified. The technique thereby determines whether the access request is an attack (is not a normal access).

A known example of such a technique is configured to: learn, as features (profile) of normal access requests, information (character class strings) that is obtained op abstracting respective character string structures of parameter values for respective combinations of paths and parameter keys in Hypertext Transfer Protocol (HTTP) requests to a website; and detect a previously unknown attack by detecting a similarity of the profile to a character class string of a parameter value in an HTTP request that is an analysis target.

CITATION LIST

Non Patent Citation

Patent Document 1: International Publication Pamphlet No. WO 2015/186662

SUMMARY OF INVENTION

Technical Problem

Conventional techniques are inconvenient in the cases when dynamically Generated paths are included. In such a case, erroneous attack detection frequently occurs, and efficient attack detection may be inhibited. For example, with conventional techniques, erroneous detection may frequently occur because, when parameter values are learned for respective combinations of dynamically generated paths and parameter keys that correspond to those paths, the numbers of occurrences of the parameter values for the learning are insufficient, and an inappropriate profile is consequently generated.

For example, with conventional techniques, an attack may be missed because, when dynamically generated paths are those generated only one time in accordance with specifications of a Web application or the like and a profile is generated using such dynamically generated paths, no corresponding path is found in the profile in detection. For example, with conventional techniques, when learning is performed with respect to each dynamically generated path, the size of a profile increases in proportion to the number of paths that have been generated, and time needed for comparison in detection may also increase in proportion thereto.

The present invention has been made to eliminate inconveniences involved in techniques such as those described above and is directed to providing a generation method, a generation apparatus, and a generation program that are enabled to prevent erroneous detection in attack detection and efficiently perform attack detection even when dynamically generated paths are included.

Solution to Problem

A generation method includes: identifying, as paths that are abstraction candidates, dynamically generated paths among paths in a profile that is used to determine whether each request to a server is an attack, and counting numbers of path variations corresponding to the respective paths that are abstraction candidates; and abstracting paths contained in the profile when a number of variations counted at the counting satisfies a certain condition, by processing circuitry.

A generation apparatus includes: a memory; and processing circuitry coupled to the memory and configured to: identify, as paths that are abstraction candidates, dynamically generated paths among paths in a profile that is used to determine whether each request to a server is an attack, and count numbers of path variations corresponding to the respective paths that are abstraction candidates and abstract paths contained in the profile when a number of variations counted satisfies a certain condition.

A non-transitory computer-readable recording medium stores therein a generation program that causes a computer to execute a process including: identifying, as paths that are abstraction candidates, dynamically generated paths among paths in a profile that is used to determine whether each request to a server is an attack, and counting numbers of path variations corresponding to the respective paths that are abstraction candidates; and abstracting paths contained in the profile when a number of variations counted at the counting satisfies a certain condition.

Effects of Invention

According to the present invention, even when dynamically generated paths are included, erroneous detection in attack detection can be prevented and attack detection can be efficiently performed.

BRIEF DESCRIPTION OF DRAWINGS

FIG. 3 is an illustration for explaining a method for calculating a similarity to a profile.

FIG. 4 explains the outlines of learning processing and detection processing.

FIG. 5 illustrates an example of the profile.

FIG. 6 explains the profile before path abstraction.

FIG. 7 explains the profile after path abstraction.

FIG. 8 explains a path abstraction candidate counting list.

FIG. 10 explains path abstraction necessity determination processing.

FIG. 12 explains processing for automatically generating an abstraction candidate path.

FIG. 15 explains processing for abstracting parameter keys.

EMBODIMENTS FOR CARRYING OUT THE INVENTION

The following describes an embodiment of a generation method, a generation apparatus, and a generation program according to the present application in detail based on the drawings. The embodiments described below are not intended to limit the present invention.

Configuration of First Embodiment

Figure 1:
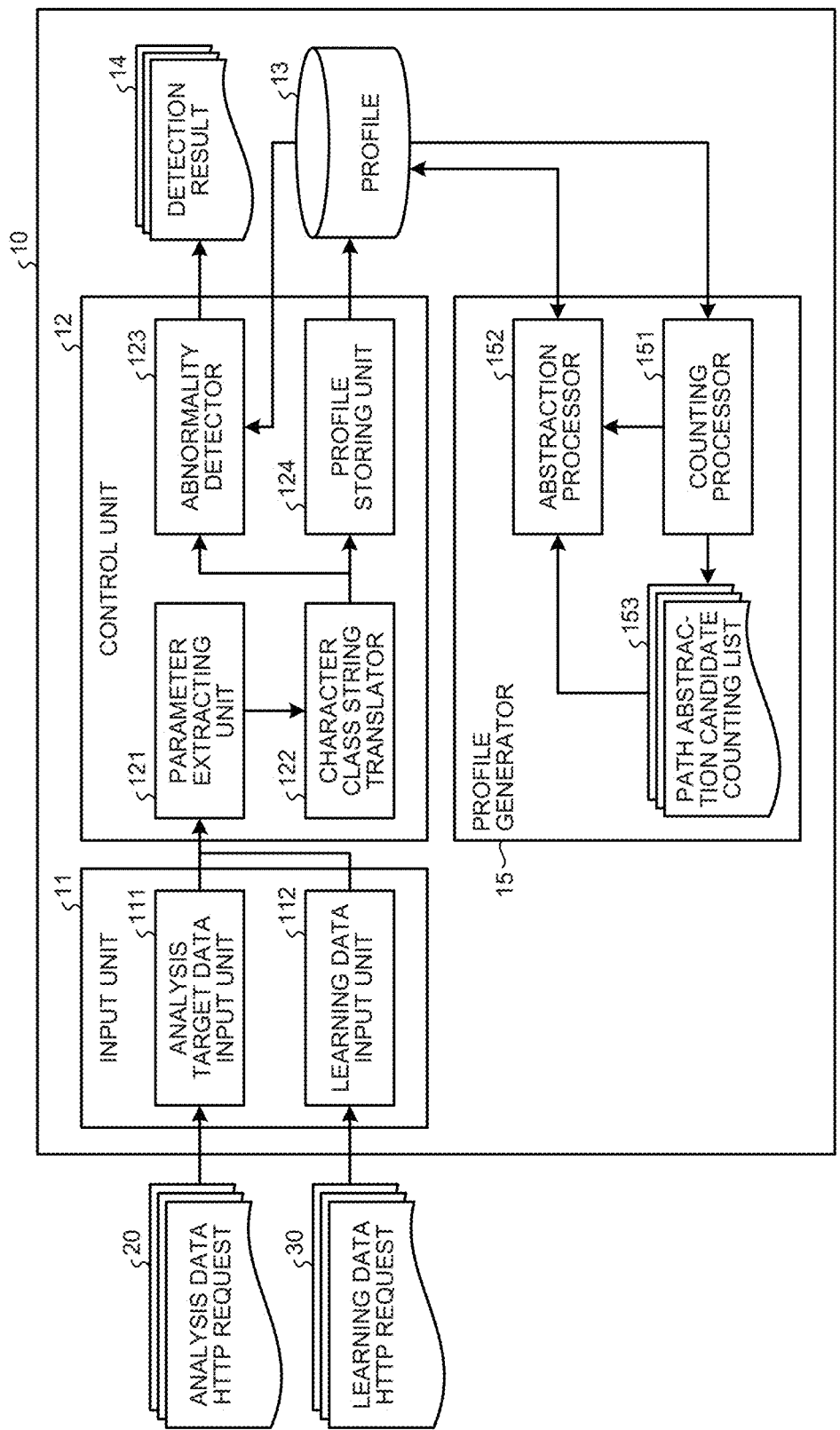
FIG. 1 is a diagram illustrating an example of the configuration of a generation apparatus according to a first embodiment.

First, the configuration of a generation apparatus according to a first embodiment is described with reference to FIG. 1. FIG. 1 is a diagram illustrating an example of the configuration of the generation apparatus according to the first embodiment. As illustrated in FIG. 1, the generation apparatus 10 includes an input unit 11, a control unit 12, and a profile generator 15. The generation apparatus 10 is an apparatus for generating a profile 13, which is used for determining whether a request to a server is an attack, based on a similarity thereof to the request. The generation apparatus 10 can also detect, by using the profile 13, a request that is an attack.

The input unit 11 receives input of data to be used for learn ng or analysis in the generation apparatus 10. The input unit 11 includes an analysis target data input unit 111 and a learning data input unit 112. The analysis target data input unit 111 receives input of analysis data HTTP requests 20.

The learning data input unit 112 receives input of learning data HTTP requests 30. The analysis data HTTP requests 20 and the learning data HTTP requests 30 are, for example, HTTP requests that are generated when a website is accessed. The learning data HTTP requests 30 may be HTTP requests that are previously found to be attacks.

The control unit 12 includes a parameter extracting unit 121, a character class string translator 122, an abnormality detector 123, and a profile storing unit 124. The control unit 12 performs processing for learning to generate the profile 13 and for detection of an HTTP request that is an attack.

The parameter extracting unit 121 extracts a path, a parameter key, and a parameter value that corresponds to the parameter key, from each of the analysis data HTTP requests 20 and the learning data HTTP requests 30 that are input to the input unit 11.

For example, when the learning data HTTP request 30 includes a Uniform Resource Locator (URL) "http://example.com/index.php?id=03&file=Top001.png", the parameter extracting unit 121 extracts "index.php" as a path, extracts "id" and "file" as parameter keys, and extracts "03" and "Top001.png" as parameter values.

The character class string translator 122 translates each parameter value extracted by the parameter extracting unit 121 into character class strings. For example, the character class string translator 122 translates "03" and "Top001.png", which are parameter values extracted by the parameter extracting unit 121, into character class strings.

The character class string translator 122 translates a parameter value into a character class string, for example, by replacing a part composed of numbers in the parameter value with "numeric", a part composed of alphabets therein with "alpha", and a part composed of symbols therein with "symbol". The character class string translator 122, for example, translates the parameter value "03" into a character class string "(numeric)". The character class string translator 122, for example, translates the parameter value "Top001.png" into a character class string "(alpha, numeric, symbol, alpha)".

The abnormality detector 123 performs attack detection by, for example, calculating a similarity in terms of path, parameter key, and character class string between the profile 13 and input that is received from the character class string translator 122, and then comparing the calculated similarity with a threshold. For example, the abnormality detector 123 detects one of the analysis data HTTP requests 20 as an attack if the similarity between the profile 13 and that one of the analysis data HTTP request 20 in terms of path, parameter key, and character class string is a threshold or less. The abnormality detector 123 outputs a detection result 14.

The profile storing unit 124 stores paths, parameter keys, and character class strings that are received from the character class string translator 122, as the profile 13. In this storing, when there are a plurality of character class strings corresponding to a path and a parameter key, character class strings the numbers of occurrences of which exceed a threshold among the plurality of character class strings, for example, are stored as the profile 13. The control unit 12 functions as a learning unit through processing that is performed by the profile storing unit 124.

Figure 2:
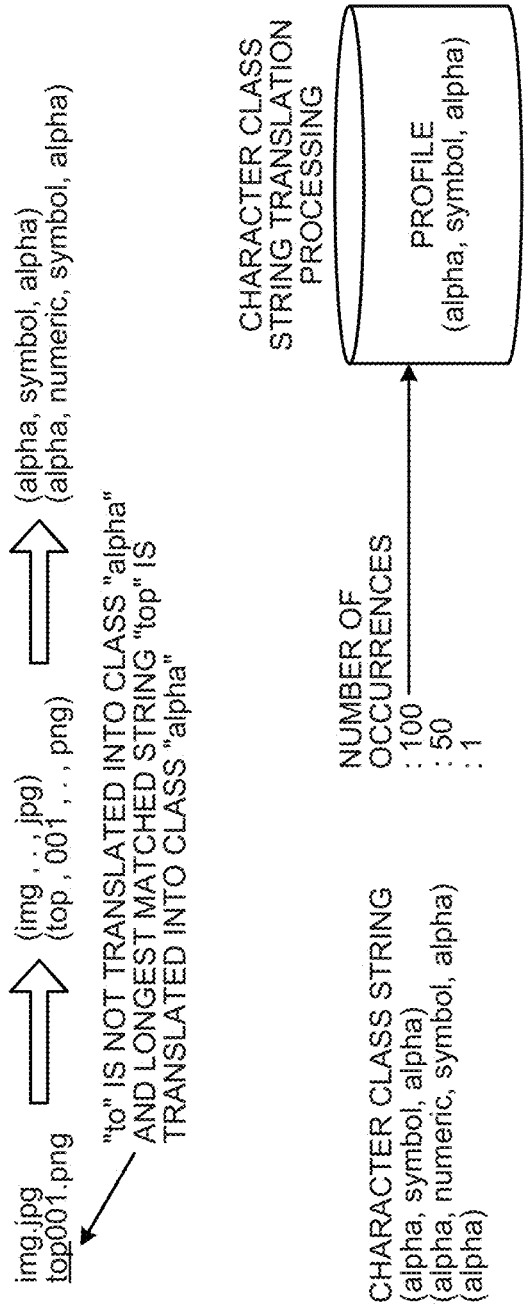
FIG. 2 is an illustration for explaining processing that is performed by a character class string translator and a profile storing unit.

Processing in the control unit 12 is described using an example in FIG. 2. FIG. 2 is an illustration for explaining processing that is performed by the character class string translator 122 and the profile storing unit 124. The uppermost part of FIG. 2 illustrates an example of definitions of character classes into each of which a plurality of character string variations that indicate parameter values of the same type are classified. Examples of the character classes include character classes such as "numeric" and "space". The middle part of FIG. 2 illustrates a manner in which: all parts of each parameter value, from the from the first character through the last character thereof, are compared with character classes; the longest part among the parts that correspond to a certain character class is replaced with the character class; and the parameter value is translated into a character class string in which character classes are arranged in order. The lowermost part of FIG. 2 illustrates a manner in which: a character class string is obtained for each parameter value in the above described manner; and the character class string is stored as the profile the number of occurrences thereof exceeds a threshold.

When translating a parameter value into a character class string, the character class string translator 122 the control unit 12 determines a certain partial character string among partial character strings in the parameter value to correspond to one of the character classes if the certain partial character string is the longest among the partial character strings that are matched with a previously prepared regular expression for the one of the character classes. The character class string translator 122 then translates all of such certain partial character strings in the parameter value into the corresponding character classes in order from the first character through the last character in the parameter value. This processing enables any parameter value to be translated into a character class string even if the parameter value has a complex structure such as a structure in which a plurality of parts that are defined as corresponding to one of the character classes are joined or compounded. The profile storing unit 124 then selects a character class string the number of occurrences of which exceeds a threshold when selecting a character class string, and stores the selected character class string as the profile 13.

Next, a method for calculating a similarity to a profile is described using FIG. 3. FIG. 3 is an illustration for explaining a method for calculating a similarity to a profile. In this example, test data is used as data to be analysed. The character class string translator 122 translates parameter values into character class strings in the same manner as in learning processing. The abnormality detector 123 obtains a similarity of each character class string to the profile. For a similarity calculation method, the longest common substring (LCS) illustrated in FIG. 3 can be used, for example. Based on the result of such calculation, the abnormality detector 123 determines a corresponding request to be an attack if a similarity S is smaller than a threshold St, and otherwise determines the request not to be an attack.

Next, the outlines of the learning processing and detection processing are explained using FIG. 4. FIG. 4 explains the outlines of the learning processing and the detection processing. In the example illustrated in FIG. 4, a parameter key "file" is used for the explanation. In this example, test data is used as data to be analyzed.

In the learning processing, the control unit 12 selects a character class string the number of occurrences of which exceeds a threshold. In the detection processing, the control unit 12 performs similarity calculation following translation into character class strings and determines, based on a similarity obtained thereby, whether a corresponding request is an attack.

Specifically, as illustrated in FIG. 4, the character class string translator 122 translates respective parameter values "Img.jpg", "Test.png", and "Top001.png" into character class strings "(alpha, symbol, alpha)", "(alpha, symbol, alpha)", and "(alpha, numeric, symbol, alpha)", The character class string translator 122 also translates respective parameter values "Test_011.jpg" and "Test_011.jpg' or 1=1" into character class strings "(alpha, symbol, numeric, symbol, alpha)" and "(alpha, symbol, numeric, symbol, alpha, symbol, . . . )".

Subsequently, for pieces of data each containing a combination of a path and a parameter key that correspond to the character class strings "(alpha, symbol, numeric, symbol, alpha)" and "(alpha, symbol, numeric, symbol, alpha, symbol, . . . )" that have been obtained from the test data, the abnormality detector 123 calculates respective similarities of these pieces of data to the profile 13. The abnormality detector 123 then performs attack detection by determining each of these pieces of data to be an attack if the similarity S thereof is smaller than the threshold St, and otherwise determines that the piece of data not to be an attack.

The profile storing unit 124 stores in the profile 13, for example, "(alpha, symbol, alpha)" as a character class string with the highest number of occurrences among character class strings that correspond to a path "index.php" and a parameter key "file" in URLs contained in learning data.

Here, an example of the profile 13 is described using FIG. 5. FIG. 5 illustrates an example of the profile. As illustrated in FIG. 5, the profile 13 is a database that retains a learned character class string and the number of occurrences of the learned character class string in association with each combination of a path and a parameter key. Each entry in the profile 13 is generated, updated, or deleted through learning or by an operation. Each entry in the profile 13 may be subjected to path abstraction processing by an abstraction processor 152, which is described below. The profile 13 is referred to by the abnormality detector 123 in the detection processing and is to be compared with a character class string in data to be analyzed.

In the example illustrated in FIG. 5, "NU" denotes a part "numeric" composed of numbers in parameter values, "AL" denotes a part "alpha" composed of alphabets therein, and "SY" denotes a part "symbol" composed of symbols therein. Such abbreviations are used as appropriate in the following description.

The profile generator 15 includes a counting processor 151, an abstraction processor 152, and a path abstraction candidate counting list 153. The counting processor 151 performs processing for: identifying, as paths that are abstraction candidates, dynamically generated paths among paths in the profile 13 that is used to determine whether each HTTP request to a server is an attack; and counting the numbers of path variations that correspond to the respective paths that are abstraction candidates.

The abstraction processor 152 performs processing for abstracting paths contained in the profile 13 if the number of corresponding variations counted by the counting processor 151 satisfies a certain condition. Specifically, if any of the numbers of variations thus counted is a certain threshold or larger, the abstraction processor 152 performs the processing for abstracting paths contained in the profile 13.

Here, the outline of processing in the profile generator 15 is described using FIGS. 6 and 7. FIG. 6 explains the profile before path abstraction. FIG. 7 explains the profile after path abstraction. As illustrated in FIG. 6, the control unit 12 described above extracts paths, parameter keys, and parameter values from learning data HTTP requests, translates the extracted parameter values into character class strings, and stores, in the profile 13, a character class string the number of occurrences of which exceeds a threshold among character class strings that correspond to paths and parameter keys from URLs in learning data. The profile 13 retains a learned character class string and the number of occurrences of the character class string in association with each combination of a path and a parameter key.

Here, each path in learning data HTTP requests illustrated in FIG. 6 is a path: that has been dynamically generated as a path different from any other paths when an individual one of the requests is made; and the number of occurrences of which is 1. It is desirable that a profile be generated with dynamically generated paths regarded as the same path.

For that reason, as illustrated in FIG. 7, when a learning data HTTP request contains a dynamically generated path, the profile generator 15 handles the dynamically generated path as an abstraction target path and performs path abstraction processing in which the entirety of or a partial character string in the abstraction target path is replaced with a specific character string. For example, in the example illustrated in FIG. 7, a part replaced with "<DYNAMIC>" (indicating an abstracted path) in a character string in a path is a part that corresponds to a dynamically generated path. In the learning processing, the generation apparatus 10 generates a profile using information after path abstraction. In the detection processing, the generation apparatus 10 calculates a similarity for a target character class string using information after path abstraction, and performs attack detection.

Any method may be used as a method for identifying dynamically generated paths. For example, if a path in the profile satisfies a certain condition or is matched with a certain pattern, the abstraction processor 152 identifies the path in the profile as a dynamically generated path and consequently as a path abstraction candidate. In an example manner, paths that satisfy a certain condition (for example, such that three hexadecimal numbers are continually contained in the paths) are identified as dynamically generated paths. In another example manner, paths that are matched with a certain pattern that is previously defined (for example, "/*/program.php") are identified as dynamically generated paths.

The path abstraction candidate counting list 153 is, as illustrated in FIG. 8, a list in which an abstraction candidate path (character strings obtained by replacing dynamically generated paths with a specific character string (for example, <DYNAMIC>)), abstraction target paths (dynamically generated paths), and the number of path variations (the number of variations of abstraction target path) are temporarily stored. The path abstraction candidate counting list 153 is used for counting abstraction target paths in the abstraction processor 152. The path abstraction candidate counting list 153 is generated by the counting processor 151 each time when the profile 13 is generated or updated. The path abstraction candidate counting list 153 is deleted after the path abstraction processing.

For example, a method that may be used to generate path abstraction candidates is to previously define patterns. For example, this method is explained as follows using the example illustrated in FIG. 8. A pattern "/*/program.php" is defined previously, and the counting processor 151 replaces, with "/<DYNAMIC>/program.php", paths that are each matched with the pattern, and enters the paths in the path abstraction candidate counting list 153.

Processing According to First Embodiment

Figure 9:
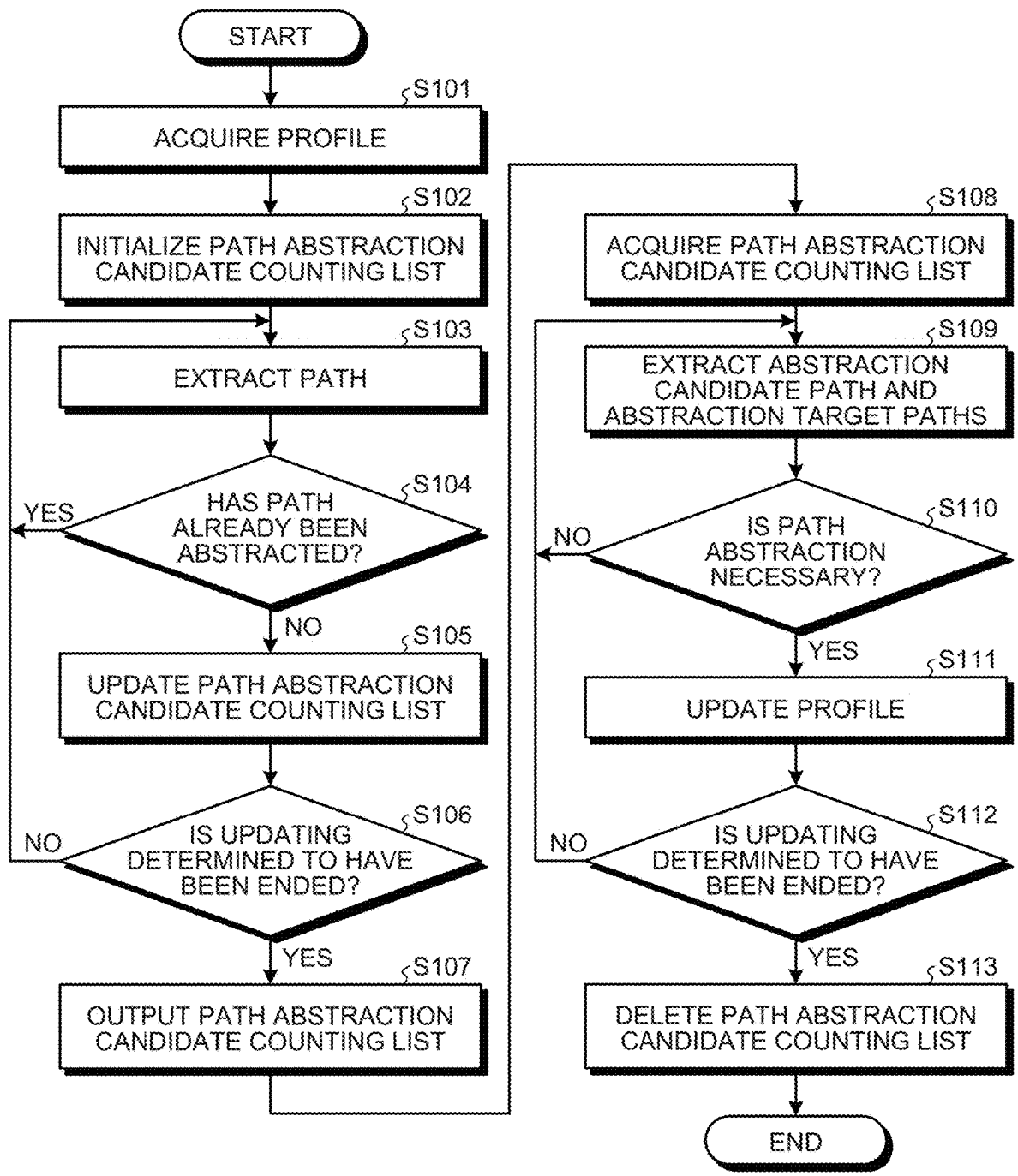
FIG. 9 is a flowchart illustrating the procedure of processing that is performed by a profile generator an the generation apparatus according to the first embodiment.

Next, the procedure of processing that is performed by the profile generator 15 in the generation apparatus 10 is described using FIG. 9. FIG. 9 is a flowchart illustrating the procedure of processing that is performed by the profile generator in the generation apparatus according to the first embodiment. It is assumed that generation or update of the profile 13 by the profile storing unit 124 triggers the processing illustrated in FIG. 9 to start.

As illustrated in FIG. 9, the counting processor 151 in the generation apparatus 10 acquires the profile 13 (step S101). Elements of the profile 13 include, at least, paths, parameter keys, character class strings, and the numbers of occurrences of the character class strings. Subsequently, the counting processor 151 performs initialization processing in which the path abstraction candidate counting list 153 that is empty is generated (step S102). Elements of the path abstraction candidate counting list 153 include, at least, abstraction candidate paths, abstraction target paths, and the numbers of path variations.

The counting processor 151 then extracts a path, a parameter key, and a character class string in the first row of the profile 13 acquired (step S103), and determines whether the path in the row extracted from the profile 13 has already been abstracted (step S104). For example, if it is determined that a post-replacement character string (denoted by <DYNAMIC> hereinbelow) for path abstraction is included (Yes at step S104), the counting processor 151 returns to step S103 and performs the processing on the next row in the profile 13. Another method that may be used to determine whether a path has already been abstracted is, for example, to: provide the profile 13 with path abstraction flags indicating whether the corresponding paths have already been abstracted; and determine each of the paths to be before being abstracted if the corresponding path abstraction flag is "0" and to have already been abstracted if the corresponding path abstraction flag is "1".

If it is determined that <DYNAMIC> is not included (No at step S104), the counting processor 151 determines that the path is a candidate for path abstraction processing and performs processing for updating the path abstraction candidate counting list 153 (step S105).

Specifically, the counting processor 151 confirms whether a combination of an abstraction candidate path that corresponds to the path and the path (an abstraction target path) is already present in the path abstraction candidate counting list 153, and performs any one of the following procedures (a) to (c) for updating the path abstraction candidate counting list 153 in accordance with the result of the confirmation. Here, there is no possibility that a case in which "a path is present while an abstraction candidate path that corresponds to the path is not present" occurs in the processing. In addition, an abstraction candidate path that corresponds to a path and the path are not added in the path abstraction candidate counting list 153 when the path does not include a dynamically generated path (no abstraction candidate path that corresponds to the path can be generated).

(a) If both an abstraction candidate path that corresponds to the path and the path are not present.

The abstraction candidate path that corresponds to the path and the path are newly generated as an entry in the path abstraction candidate counting list 153, and the count of the number of path variations is set to 1.

(b) If the path is not present while an abstraction candidate path that corresponds to the path is present The path is added as an entry that corresponds to the abstraction candidate path in the path abstraction candidate counting list 153, and the count of the number of path variations is incremented by 1.

(c) If both an abstraction candidate path that corresponds to the path and the path are present.

The abstraction candidate path that corresponds to the path and the path are not added in the path abstraction candidate counting list 153.

Thereafter, the counting processor 151 determines whether an ending condition is satisfied (step S106). For example, if there is any row left in the profile 13 acquired, the counting processor 151 determines that the ending condition is not satisfied (No at step S106), returns to step S103, and performs the processing on the next row in the profile 13. For example, if there is no row left in the profile 13 acquired, the counting processor 151 determines that the ending condition is satisfied (Yes at step S106) and outputs the path abstraction candidate counting list 153 to the abstraction processor 152 (step S107).

Subsequently, the abstraction processor 152 acquires the path abstraction candidate counting list 153 (step S108) and extracts an abstraction candidate path, abstraction target paths, and the number of path variations in the first row in the path abstraction candidate counting list 153 (step S109). The abstraction processor 152 determines whether to perform path abstraction (step S110). For example, if the number of path variations that corresponds to the abstraction candidate path extracted from the path abstraction candidate counting list 153 is at least a threshold (Yes at step S110), the abstraction processor 152 determines that the path is one for which path abstraction is necessary, and then performs profile update processing (step S111).

For example, if the number of path variations that corresponds to the abstraction candidate path extracted from the path abstraction candidate counting list 153 is less than the threshold. (No at step S110), the abstraction processor 152 determines that the path is one for which path abstraction is unnecessary and that the path is therefore not subject to further processing. The abstraction processor 152 then returns to step S109 and performs the processing on the next row in the path abstraction candidate counting list 153.

Here, processing for determining whether to perform path abstraction is described using the example illustrated in FIG. 10. FIG. 10 explains processing for determining whether a path has already been abstracted. The example illustrated in FIG. 10 assumes the threshold for the number of path variations to be "3". In such a case, as illustrated in FIG. 10, the number of path variations that corresponds to the abstraction candidate path "/<DYNAMIC>/program.php" is "3", which is not less than the threshold "3" for the number of path variations. Therefore, the abstraction processor 152 determines that path abstraction is "necessary" for the abstraction candidate path "/<DYNAMIC>/program.php". In contrast, the number of path variations that corresponds to the abstraction candidate path "/<DYNAMIC>/((view.php" is "1" which is less than the threshold "3" for the number of path variations. Therefore, the abstraction processor 152 determines that path abstraction is "unnecessary" for the abstraction candidate path "/<DYNAMIC>/view.php".

Figure 11:
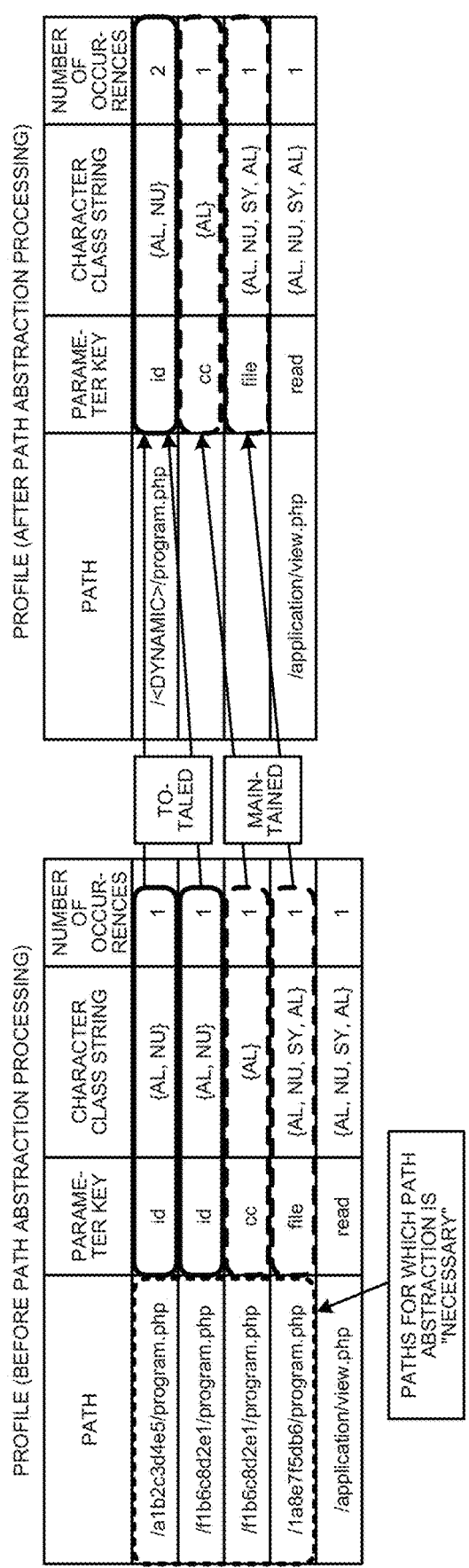
FIG. 11 explains profile update processing.

The description continues with reference to FIG. 9 again. At step S111, the abstraction processor 152 merges, in the profile, paths for which path abstraction has been determined to be "necessary" (path abstraction processing). In processing for the merging, the abstraction processor 152 replaces dynamically generated paths with "<DYNAMIC>" and aggregates character class strings that correspond to the paths. As illustrated in FIG. 11, the abstraction processor 152 totals the numbers of occurrences of respective character class strings that correspond to a parameter key and to abstraction target paths that correspond to identical character class strings. At the same time, the abstraction processor 152 maintains the numbers of occurrences of character class strings that correspond to a parameter key and to abstraction target paths that correspond to character class strings that are not identical to any other character class strings that corresponds to the parameter key.

The description continues with reference to FIG. 9 again. The abstraction processor 152 determines whether an ending condition is satisfied (step S112). For example, if there is any row left in the path abstraction candidate counting list. 153 acquired, the abstraction processor 152 determines that the ending condition is not satisfied (No at step S112), returns to step S109, and performs the processing on the next row in the path abstraction candidate counting list 153. For example, if there is no row left in the path abstraction candidate counting list 153 acquired, the abstraction processor 152 determines that the ending condition is satisfied (Yes at step S112), deletes the path abstraction candidate counting list 153 (step S113), and eon the processing.

As described above, the generation apparatus 10 according to the first embodiment abstracts dynamically generated paths after determining, based on the threshold for the number of variations of abstraction target path, whether path abstraction is necessary. The generation apparatus 10 replaces only dynamically generated paths with specific character strings in the path abstraction processing, thereby generating the profile 13 in which original path configurations are preserved.

Modifications

While an embodiment according to the present invention is described above, the present invention may be implemented in various different forms other than the above described embodiment. Other embodiments that fall within the scope of the present invention are described hereinbelow as modifications.

(1) Automatic Generation of Patterns

In the above description, previously defining patterns is described as a method that is used to generate path abstraction candidates. However, the method is not limited thereto and may be, for example, to automatically generate patterns.

For example, a manner that is thought possible is as follows: the counting processor 151 in the generation apparatus 10 generates an abstraction candidate path by replacing, with a specific character string, a path that includes a hexadecimal number of three or more digits; and, subsequently, if path abstraction for the abstraction candidate path is determined to be "necessary", the counting processor 151 in the generation apparatus 10 generates a corresponding pattern. For example, this manner is explained as follows using the example illustrated in FIG. 12. In paths including a hexadecimal number of three or more digits, the hexadecimal numbers are replaced with <HEX>. Path abstraction for the paths is then determined to be "necessary", and "</hexadecimal number of at least 3 digits>/program.php" is then generated as a pattern from a corresponding abstraction candidate path.

For example, another manner that is thought possible is as follows: the counting processor 151 in the generation apparatus 10 generates a pattern by automatically extracting a common character string in paths. For example, the counting processor 151 in the generation apparatus 10 may automatically extract a common character string using the longest common substring (LCS). While a single part of each path is abstracted in the above description, two or more parts of each path may be abstracted. Alternatively, the manner in which patterns are defined previously and the manner in which patterns are automatically generated may be used in combination.

(2) Aggregation Targets

Character class strings that are handled as aggregation targets are described as being identical character class strings in the above description, but are not limited thereto. For example, character class strings the similarity between which is at least a certain threshold may be handled as aggregation targets in addition to identical character class strings.

Figure 13:
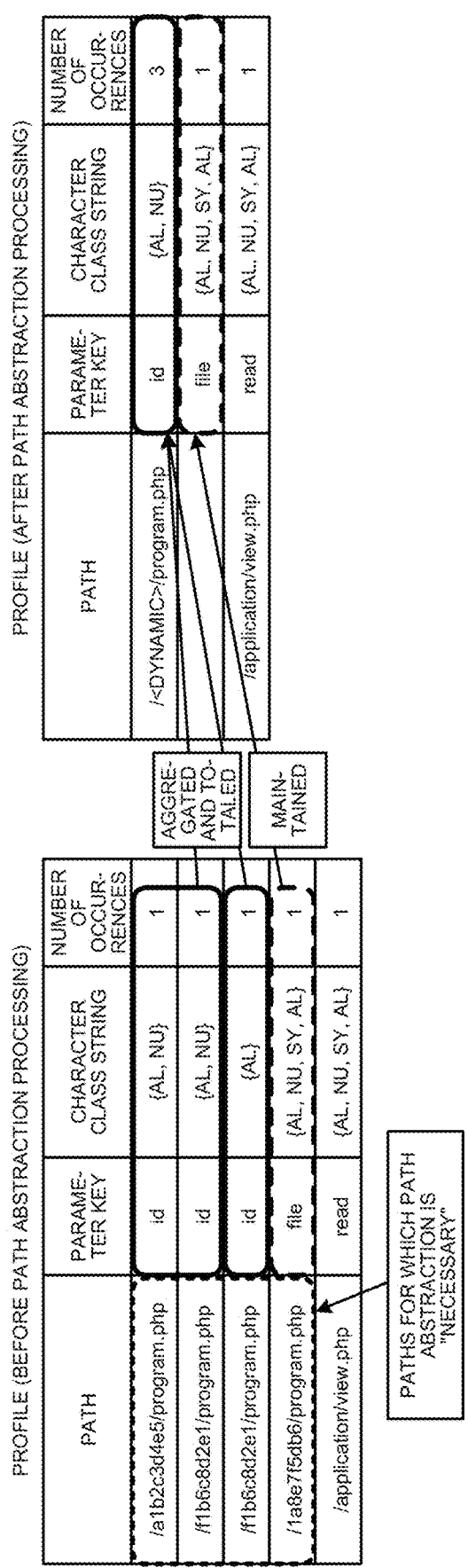
FIG. 13 explains processing for consolidating identical character class strings and a character class string similar thereto.

The abstraction processor 152 in the generation apparatus 10 can use, for example, the longest common substring (LCS) for a similarity calculation method. The abstraction processor 152 in the generation apparatus 10 can also use, for example, the longest common substring for a method for aggregating character class strings. For example, when X and Y denote character class strings, the abstraction processor 152 aggregates the character class strings into Y if LCS(X, Y)=X, aggregates the character class strings into X if LCS(X, Y)=Y, and does not aggregate the character class strings otherwise. Here, LCS(X, Y) denotes the longest common substring to the character class strings X and Y. For example, in the example illustrated in FIG. 13, LCS({AL, NU}, {AL})={AL} holds for character class strings that correspond to a parameter key "id", and the character class strings are aggregated into{AL, NU}. That is, this is explained as follows using the example illustrated in FIG. 13. If there is a character class string that is matched with the longest common substring {AL} to the character class string {AL, NU} and the character class string {AL} that corresponds to parameter keys that are identical, the abstraction processor 152 aggregates two variations of character class string, {AL, NU} and {AL}, into the character class string {AL, NU}.

Figure 14:
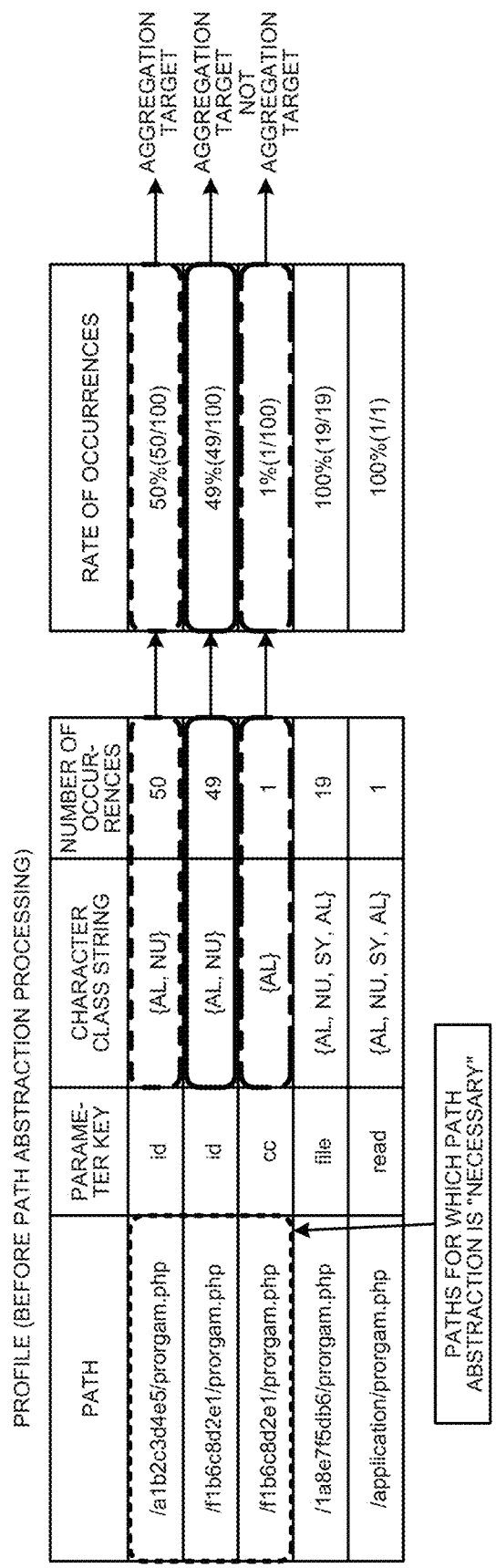
FIG. 14 explains processing for determining whether each character class string is to be aggregated.

The above manner is applied to generation of a profile that may enable more accurate attack detection by excluding, as aggregation targets, character class strings the numbers of occurrences of which are low. This is because such character class strings may have been learned from HTTP requests that contain parameter values that have been erroneously input or HTTP requests that are attacks. Therefore, when character class strings are aggregated, the rates of occurrences of respective character class strings may be found, and a rare character class string the rate of occurrences of which is low may be identified by use of a threshold and excluded as aggregation targets. For example, as illustrated in FIG. 14, when the threshold for the rate of occurrence is 5%, the abstraction processor 152 handles character class strings as aggregation targets if the rates of occurrences thereof are at least 5%, and excludes character class strings as aggregation targets if the rates of occurrences thereof are less than 5%.

(3) Abstraction of Parameter Key

In the above description, a case in which paths are abstracted is described. However, this is not a limiting example, and, for example, parameter keys may be abstracted. Paths and parameter keys may be abstracted together.

Here, a parameter key abstraction candidate counting list is described using FIG. 15. As illustrated in FIG. 15, the counting processor 151 generates a parameter key abstraction candidate counting list by using "path for abstraction candidate parameter key", "abstraction candidate parameter key", and "abstraction target parameter key" instead of using "abstraction candidate path" and "abstraction target path" in the path abstraction candidate counting list 153 described above. When parameter keys for different paths are abstracted, paths for abstraction candidate parameter keys are set to "*" (a wild card).

When parameter keys are thus abstracted, the counting processor 151 performs processing for updating the parameter key abstraction candidate counting list at step S105 described above.

Specifically, the counting processor 151 confirms whether a path for an abstraction candidate parameter key is already present in the parameter key abstraction candidate counting list. The counting processor 151 then performs any one of the following updating procedures (a) to (c) if a path for the abstraction candidate parameter key is already present in the parameter key abstraction candidate counting list. The counting processor 151 performs the following updating procedure (d) if a path for the abstraction candidate parameter key is not present in the parameter key abstraction candidate counting list. Here, there is no possibility that a case in which "a parameter key is present while an abstraction candidate parameter key that corresponds to the parameter key is not present" occurs in the processing. In addition, an abstraction candidate parameter key that corresponds to a parameter key and the parameter key are not added in the parameter key abstraction candidate counting list when no abstraction candidate parameter key that corresponds to the parameter key can be generated.

(a) If both an abstraction candidate parameter key that corresponds to a parameter key and the parameter key are not present An abstraction candidate parameter key that corresponds to the parameter key and the parameter key are newly Generated as an entry in the parameter key abstraction candidate counting list, and the count of the number of parameter key variations is set to 1.

(b) If a parameter key is not present while an abstraction candidate parameter key that corresponds to the parameter key is present The parameter key is added as an entry that corresponds to the abstraction candidate path that corresponds to the parameter key in the parameter key abstraction candidate counting list, and the count of the number of parameter key variations incremented by 1.

(c) If both an abstraction candidate parameter key that corresponds to a parameter key and the parameter key are present The abstraction candidate parameter key that corresponds to the parameter key and the parameter key are not added in the parameter key abstraction candidate counting list.

(d) Regardless of whether an abstraction candidate parameter key of a parameter key and the parameter key are present, a path for the abstraction candidate parameter key, the abstraction candidate parameter key, and a corresponding abstraction target parameter key are added in the parameter key abstraction candidate counting list.

Figure 16:
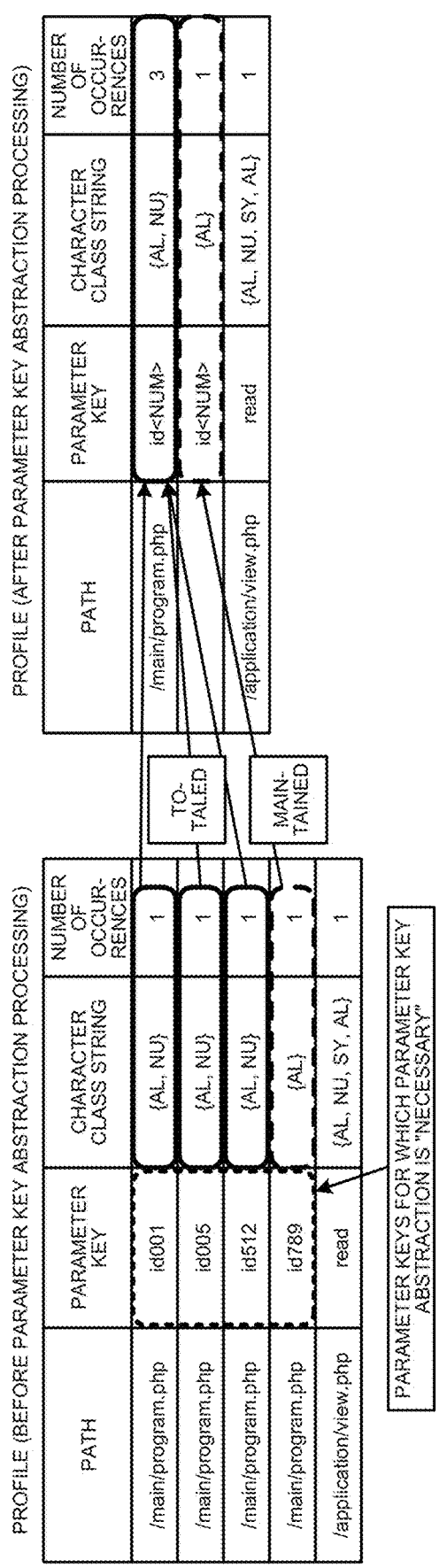
FIG. 16 explains processing for abstracting parameter keys and updating a profile.

When parameter keys are abstracted, the abstraction processor 152 performs processing for updating the profile 13 at step S111 described above, as illustrated in FIG. 16. In the example illustrated in FIG. 16, the abstraction processor 152 translates a part composed of numbers in each parameter key into <NUM>. As illustrated in FIG. 16, the abstraction processor 152 aggregates character class strings that correspond to parameter keys for which parameter key abstraction has been determined to be "necessary". As illustrated in FIG. 16, the abstraction processor 152 totals the numbers of occurrences of respective character class strings that correspond to an abstraction target parameter key and to identical character class strings. At the same time, the abstraction processor 152 maintains the numbers of occurrences of character class strings that correspond to an abstraction target parameter key and to character class strings that are not identical to any other character class strings that corresponds to the abstraction candidate parameter key.

Effects of First Embodiment

As described above, the generation apparatus 10 according to the first embodiment identifies, as paths that are abstraction candidates, dynamically generated paths among paths in a profile that is used to determine whether each request to a server is an attack, and then counts the numbers of path variations that correspond to the respective paths that are abstraction candidates. The generation apparatus 10 performs processing for abstracting paths contained in the profile if the counted number of corresponding variations satisfies a certain condition.

Therefore, the generation apparatus 10 according to the first embodiment is capable of preventing erroneous detection in attack detection and efficiently performing attack detection even when dynamically generated paths are included. Specifically, the generation apparatus 10 according to the first embodiment can produce the following effects for a Web application for which paths are dynamically generated.

For example, when learning is performed with respect to each path, the generation apparatus 10 according to the first embodiment can resolve the insufficiency of the numbers of parameter value variations and the numbers of occurrences of parameter values in parameter keys for the learning, and can consequently generate the profile 13 in which character class strings that occur in association with the parameter keys are appropriately preserved. As a result, the generation apparatus 10 according to the first embodiment can prevent erroneous detection in which normal HTTP requests are detected.

For example, the generation apparatus 10 according to the first embodiment can generate the profile 13 that is applicable to paths that are generated only once, and can consequently avoid entering a state in which the profile 13 does not contain a path with which comparison can be made. As a result, the generation apparatus 10 according to the first embodiment can perform detection even when the paths of detection target HITS requests are dynamically generated, and can consequently avoid failure to detect attacks.

For example, the generation apparatus 10 according to the first embodiment can avoid having a large profile even when the number of variations of dynamically generated path is increased. As a result, the generation apparatus 10 according to the first embodiment can take shorter time to compare detection target HTTP requests with the profile 13, and can consequently prevent the performance of a system from declining.

System Configuration and Related Configurations

Constituent elements of each of the illustrated apparatuses represent functional concepts and are not necessarily needed to be physically configured as illustrated. That is, a specific form of distribution or integration in each of the apparatuses is not limited to the illustrations, the apparatus can be configured in such a manner as to be functionally and physically distributed or integrated in any desired units in accordance with factors such as various loads and usage conditions. Furthermore, all or any desired ones of the processing functions that are executed in each of the apparatuses are implemented by a central processing unit (CPU) and a computer program that is analyzed and executed by the CPU or are implemented as hardware using wired logics.

Among the individual sequences of processing that are described in the present embodiment, any sequence of processing described as one that is automatically performed can also be entirely or partially performed manually, and any sequence of processing described as one that is manually performed can also be entirely or partially performed automatically by a known method. Other matters described in the above description and illustrated the illustrations, such as processing procedures, control procedures, specific names, and information including various data, can be, changed as desired unless otherwise stated specifically.

Computer Program

A computer program that delivers the functions of the generation apparatus 10 described in the above embodiment can be implemented by being installed in a desired information processing apparatus (computer). For example, an information processing apparatus can be caused to function as the generation apparatus 10 when caused to execute the above computer program that is provided as package software or online software. Examples of the information processing apparatus described herein include a desktop or notebook personal computer. Examples of the information processing apparatus further include a mobile communication terminal such as a smartphone, a mobile-phone device, or a personal handyphone system (PHS), and a personal digital assistant (PDA). The generation apparatus 10 may be implemented in a cloud server.

Figure 17:
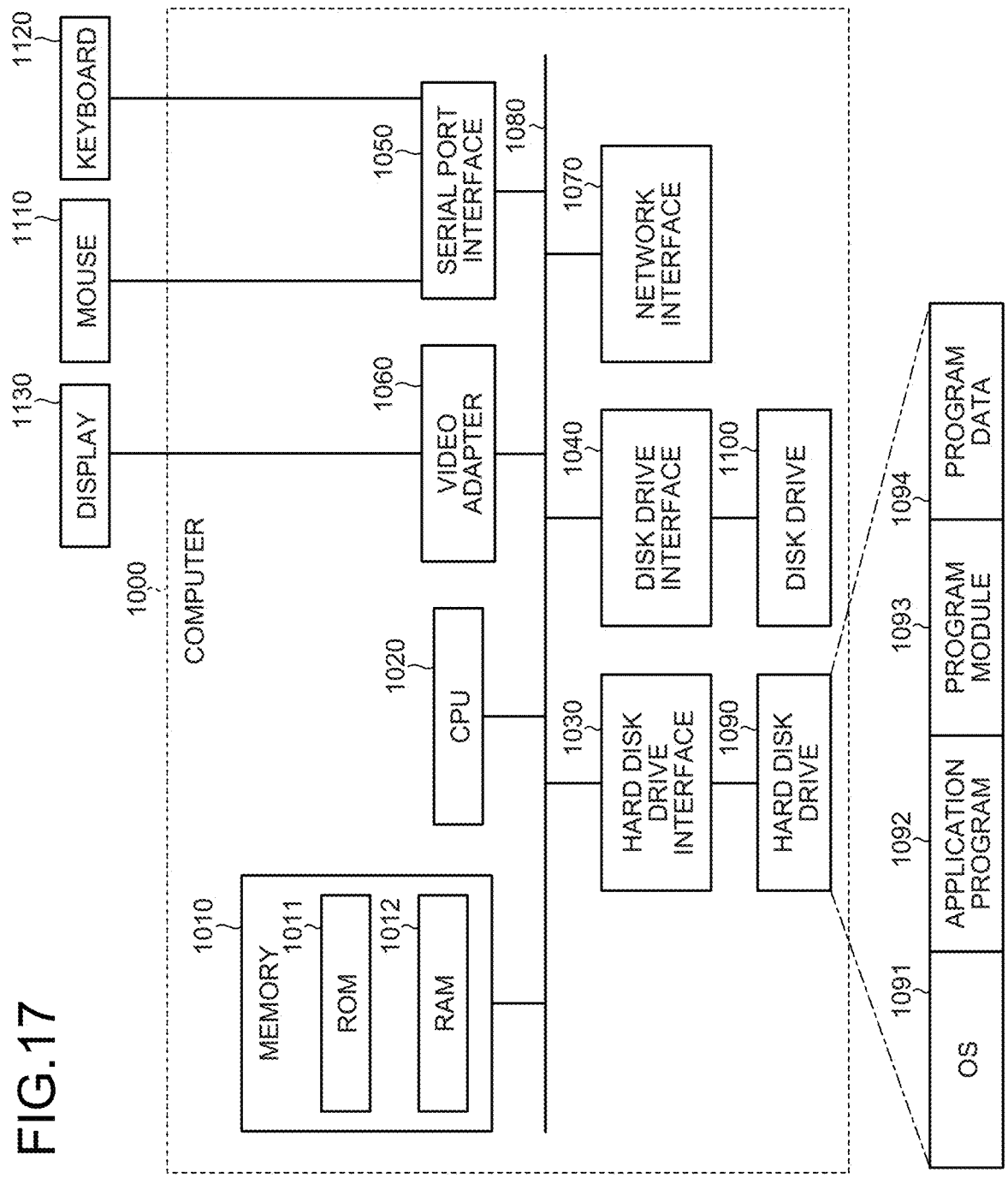
FIG. 17 illustrates an example of a computer on which a computer program is executed and a generation apparatus is thereby implemented.

An example of a computer that executes the above computer program (generation program) is described using FIG. 17. As illustrated in FIG. 17, a computer 1000 includes, for example, a memory 1010, a CPU 1020, a hard disk drive interface 1030, a disk drive, interface 1040, a serial port interface 1050, a video adapter 1060, and a network interface 1070. These components are connected to one another via a bus 1080.

The memory 1010 includes a read only memory (ROM) 1011 and a random access memory (RAM) 1012. The ROM 1011 stores therein, for example, a boot program such as a basic input output system (BIOS). The hard disk drive interface 1030 is connected to a hard disk drive 1090. The disk drive interface 1040 is connected to a disk drive 1100. For example, a removable storage medium such as a magnetic disk or an optical disc is inserted into the disk drive 1100. For example, a mouse 1110 and a keyboard 1120 are connected to the serial port interface 1050. For example, a display 1130 is connected to the video adapter 1060.

Here, as illustrated in FIG. 17, the hard disk drive 1090 stores therein, for example, an operating system (OS) 1091, an application program. 1092, a program module 1093, and program data 1094. The various kinds of data and information described in the embodiment described above are stored in, for example, the hard disk drive 1090 or the memory 1010.

The CPU 1020 then loads, into the RAM 1012, the program module 1093 and the program data 1094 that are stored in the hard disk drive 1090 and executes the above procedures.

A storage in which the program module 1093 and the program data 1094 according to the above generation program are stored is not limited to the hard disk drive 1090. The program module 1093 and the program data 1094 may be stored in, for example, a removable storage medium to be loaded by the CPU 1020 via the disk drive 1100 or the like. Alternatively, the program module 1093 and the program data 1094 according to the above program may be stored in another computer connected via a network such as a local area network (LAD) or a wide area network MAN) to be loaded by the CPU 1020 via the network interface 1070.

DESCRIPTION OF SIGNS

10 GENERATION APPARATUS
11 INPUT UNIT
12 CONTROL UNIT
13 PROFILE
14 DETECTION RESULT
15 PROFILE GENERATOR
20 ANALYSIS DATA HTTP REQUEST
30 LEARNING DATA HTTP REQUEST
111 ANALYSIS TARGET DATA INPUT UNIT
112 LEARNING DATA INPUT UNIT
121 PARAMETER EXTRACTING UNIT
122 CHARACTER CLASS STRING TRANSLATOR
123 ABNORMALITY DETECTOR
124 PROFILE STORING UNIT
151 COUNTING PROCESSOR
152 ABSTRACTION PROCESSOR
153 PATH ABSTRACTION CANDIDATE COUNTING LIST

The invention claimed is:

1. An identification and abstracting method comprising:
acquiring a profile that is used to determine whether each request to a server is an attack, the profile containing paths;
identifying, as paths that are abstraction candidates, dynamically generated paths among the paths in the profile;
counting numbers of path variations corresponding to the respective paths that are abstraction candidates; and
abstracting paths contained in the profile when a number of variations counted at the counting satisfies a certain condition, by processing circuitry, wherein
the abstracting includes:
determining, for each of the paths that are abstraction candidates, whether path abstraction is necessary; and
in response to the determining, merging, in the profile, paths for which the path abstraction has been determined to be necessary.

2. The identification and abstracting method according to claim 1, wherein, when a certain one of the numbers of variations counted at the counting is at least a certain threshold, the abstracting includes abstracting the paths that are contained in the profile.

3. The identification and abstracting method according to claim 1, wherein, when a path in the profile satisfies a certain condition or is matched with a certain pattern, the abstracting includes identifying the path in the profile as a dynamically generated path and consequently as a path that is an abstraction candidate.

4. The identification and abstracting method according to claim 1, wherein, when any of the numbers of variations counted at the counting satisfies a certain condition, the abstracting includes abstracting the paths that are contained in the profile, and totaling numbers of occurrences of character class strings that correspond to each combination of an abstracted path and a parameter key.

5. An identification and abstracting apparatus comprising:
a memory; and
processing circuitry coupled to the memory and configured to:
acquire a profile that is used to determine whether each request to a server is an attack, the profile containing paths;
identify, as paths that are abstraction candidates, dynamically generated paths among the paths in the profile;
count numbers of path variations corresponding to the respective paths that are abstraction candidates, and
abstract paths contained in the profile when a number of variations counted satisfies a certain condition, wherein
the abstracting includes:
determining, for each of the paths that are abstraction candidates, whether path abstraction is necessary; and
in response to the determining, merging, in the profile, paths for which the path abstraction has been determined to be necessary.

6. A non-transitory computer-readable recording medium storing therein an identification and abstracting program that causes a computer to execute a process comprising:
acquiring a profile that is used to determine whether each request to a server is an attack, the profile containing paths;
identifying, as paths that are abstraction candidates, dynamically generated paths among the paths in the profile;
counting numbers of path variations corresponding to the respective paths that are abstraction candidates; and
abstracting paths contained in the profile when a number of variations counted at the counting satisfies a certain condition, wherein
the abstracting includes:
determining, for each of the paths that are abstraction candidates, whether path abstraction is necessary; and
in response to the determining, merging, in the profile, paths for which the path abstraction has been determined to be necessary.

* * * * *